United States Patent
Tomizuka et al.

(10) Patent No.: US 7,492,577 B2
(45) Date of Patent: Feb. 17, 2009

(54) DISPLAY DEVICE CONVERTIBLE FROM TWO DIMENSIONAL DISPLAY TO THREE DIMENSIONAL DISPLAY

(75) Inventors: Yoshiteru Tomizuka, Mobara (JP); Yasunari Kochi, Mobara (JP); Kazuhiko Yanagawa, Mobara (JP); Nobutaka Jin, Mobara (JP)

(73) Assignee: Hitachi Displays, Ltd., Chiba (JP)

( * ) Notice: Subject to any disclaimer, the term of this patent is extended or adjusted under 35 U.S.C. 154(b) by 410 days.

(21) Appl. No.: 11/299,820

(22) Filed: Dec. 13, 2005

(65) Prior Publication Data
US 2006/0133047 A1   Jun. 22, 2006

(30) Foreign Application Priority Data
Dec. 17, 2004   (JP)   ............... 2004-365736

(51) Int. Cl.
*G06F 1/16* (2006.01)
*H05K 5/00* (2006.01)
*H05K 7/00* (2006.01)

(52) U.S. Cl. ..................................... 361/681
(58) Field of Classification Search ................. 361/681, 361/683, 716; 345/1.3
See application file for complete search history.

(56) References Cited

U.S. PATENT DOCUMENTS

| | | | |
|---|---|---|---|
| 6,262,785 B1 * | 7/2001 | Kim .............................. 349/58 |
| 6,295,038 B1 * | 9/2001 | Rebeske ....................... 345/1.1 |
| 6,532,146 B1 * | 3/2003 | Duquette ...................... 361/681 |
| 6,643,124 B1 * | 11/2003 | Wilk ............................ 361/681 |
| 7,136,282 B1 * | 11/2006 | Rebeske ....................... 361/683 |
| 7,355,338 B2 * | 4/2008 | Osame et al. ................ 313/503 |
| 2002/0063518 A1 * | 5/2002 | Okamoto et al. ............. 313/506 |
| 2003/0026068 A1 * | 2/2003 | Tsai et al. .................... 361/683 |
| 2005/0017953 A1 * | 1/2005 | Pekka .......................... 345/169 |
| 2006/0146488 A1 * | 7/2006 | Kimmel ....................... 361/681 |

FOREIGN PATENT DOCUMENTS

| CA | 2 329 666 | 12/2000 |
|---|---|---|
| JP | 2001-54144 | 4/2000 |
| JP | 2002-372929 | 6/2001 |
| JP | 2004-163587 | 11/2002 |

* cited by examiner

*Primary Examiner*—Hae Moon Hyeon
(74) *Attorney, Agent, or Firm*—Reed Smith LLP; Juan Carlos A. Marquez, Esq.

(57) ABSTRACT

A display device includes a fixed first display element and a movable second display element, the first display element and the second display element assume a first state in which the first display element and the second display element are arranged individually and a second state in which the first display element and the second display element are arranged individually in an overlapped manner.

23 Claims, 8 Drawing Sheets

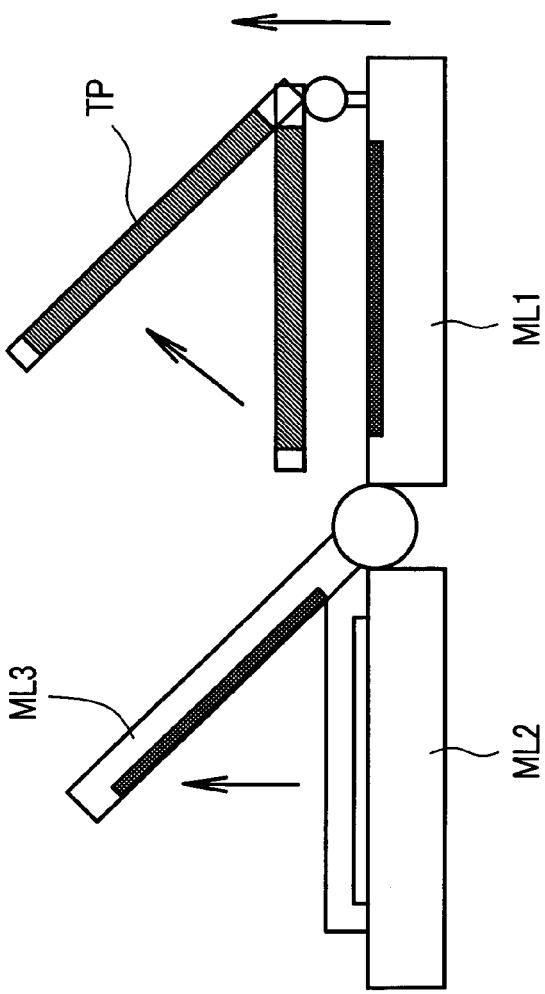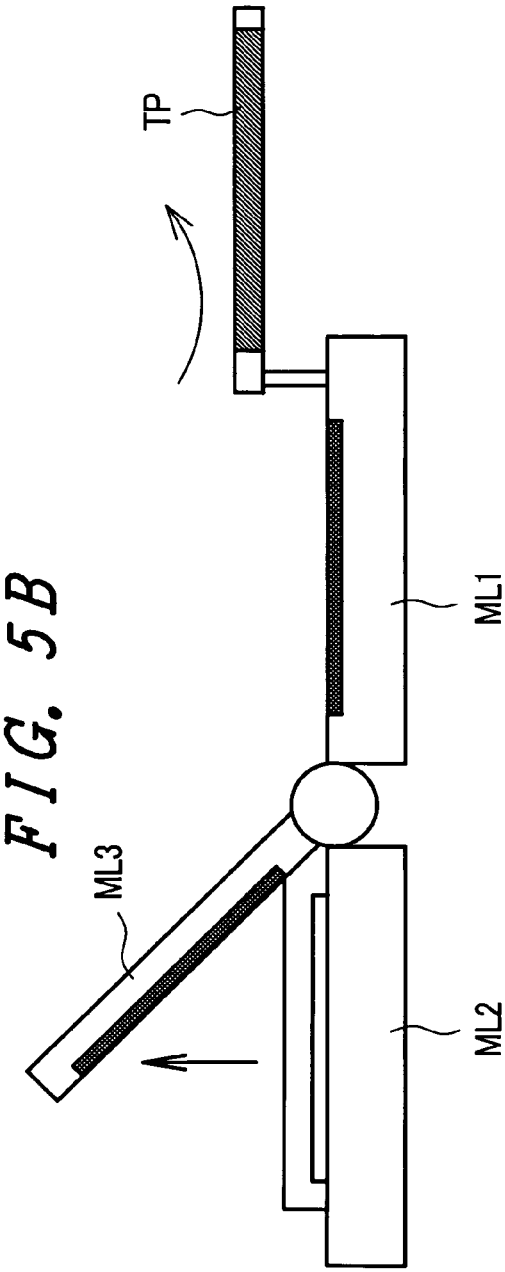

DISPLAY DEVICE CONVERTIBLE FROM TWO DIMENSIONAL DISPLAY TO THREE DIMENSIONAL DISPLAY

CLAIM OF PRIORITY

The present application claims priority from Japanese application serial No. 2004-365736, filed on (Dec. 17, 2004), the content of which is hereby incorporated by reference into this application.

BACKGROUND OF THE INVENTION

1. Field of the Invention

The present invention relates to a display device and a gaming machine provided with a display device.

2. Description of the Related Art

As a display device which simply realizes a display of a stereoscopic image, JP-A-2001-54144 discloses a technique which overlaps two planar display elements.

SUMMARY OF THE INVENTION

Although the display device can display a stereoscopic image (3D) using two display elements, one display becomes an extra in performing a 2D display. Further, unless assuming an unthinkable constitution in principle that the extra display element possesses a numerical aperture of 100% and a transmissivity of 100%, the extra display element brings about the lowering of brightness.

The present invention has been made to overcome the above-mentioned drawback and to provide a bright display device which is most suitable for 2D and 3D and a gaming machine which includes the display device.

To briefly explain the summary of typical inventions out of inventions disclosed in this specification, they are as follows (1) A display device with a first display element which is fixed and a second display element which is movable, and the first display element and the second display element assume a first state in which the first display element and the second display element are individually arranged and a second state in which the first display element and the second display element are arranged in an overlapped manner.

(2) A display device on a premise of the constitution (1), a two-dimensional image is displayed in the first state and a three-dimensional image is displayed in the second state.

(3) A display device on a premise of the constitution (1) or (2), the first state and the second state are changed over by allowing the second display element to move rotatably.

(4) A display device on a premise of the constitution (1) or (2), the first state and the second state are changed over by allowing the second display element to move horizontally.

(5) A display device on a premise of any one of the constitutions (1) to (4), an illumination part is formed on a back surface of the first display element and a light quantity of the illumination part is increased in the second state than in the first state.

(6) A display device on a premise of any one of the constitutions (1) to (5), a first illumination part is formed on a back surface of the first display element, a second illumination part is formed on a back surface of the second display element, the first illumination part and the second illumination part are turned on in the first state, and the first illumination part is turned on and the second illumination part is turned off in the second state.

(7) A display device with a first housing, a second housing and a third housing, the third housing assumes a first state in which the third housing is overlapped to the second housing and a second state in which the third housing is overlapped to the first housing, and a first display element is arranged in the first housing and a second display element is arranged in the third housing.

(8) A display device on a premise of the constitution (7), the third housing is shifted to the first state and the second state due to the rotation of the third housing.

(9) A display device on a premise of the constitution (7) or (8), the first display element and the second display element display a two-dimensional image in the first state and the first display element and the second display element display a three-dimensional image in the second state.

(10) A display device on a premise of the constitution (7) or (8), the first display element and the second display element respectively display a two-dimensional image in the first state and the first display element and the second display element display a three-dimensional image in the second state.

(11) A display device on a premise of the constitution (8), the first housing includes a first illumination part which is arranged below the first display element and a first light source which becomes a light source of the first illumination part, the second housing includes a second illumination part, a rotation part which performs the rotation of the third housing includes a light source, the rotation part includes a second light source, wherein the second light source becomes a light source of the second illumination part in the first state and the second light source becomes a light source of the first illumination part in the second state.

(12) A display device, on a premise of any one of the constitutions (7) to (11), the display device includes a movable touch panel, wherein the touch panel is arranged above the first display element in the first state and is arranged above the second display element in the second state.

(13) A display device on a premise of any one of the constitutions (7) to (12), the second display element has a display position thereof inverted in the up-side-down direction of the second display device in displaying a same figure when the rotational axis extending direction of the third housing assumes the horizontal direction in the first state and the second state, and the figure to be displayed per se is inverted up-side-down.

(14) A display device on a premise of any one of the constitutions (1) to (13), the display device is used as a gaming machine.

Due to such constitutions, the present invention can realize the display device which is capable of performing a bright display in both of a 2D display and a 3D display. Further, it is possible to provide a gaming machine which includes new game modes.

BRIEF DESCRIPTION OF THE DRAWINGS

FIG. 5 is a cross-sectional view showing another embodiment of the constitution of the present invention;

DETAILED DESCRIPTION

Hereinafter, embodiments of a display device and a gaming machine provided with such a display device according to the present invention are explained in conjunction with attached drawings hereinafter. Although the explanation is made with respect to embodiments in which the present invention is applied to a gaming machine for facilitating the explanation, it is needless to say that the display device may be formed in itself.

Figure 1A:
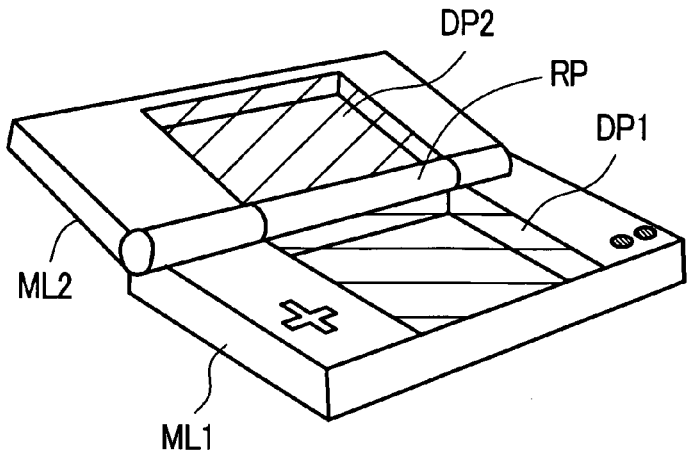
FIG. 1 is a stereoscopic view showing one embodiment of the constitution of the present invention.
Figure 1B:
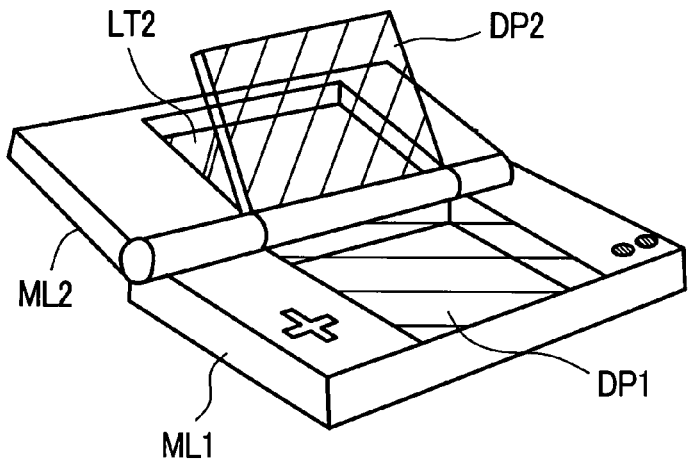
Figure 1C:
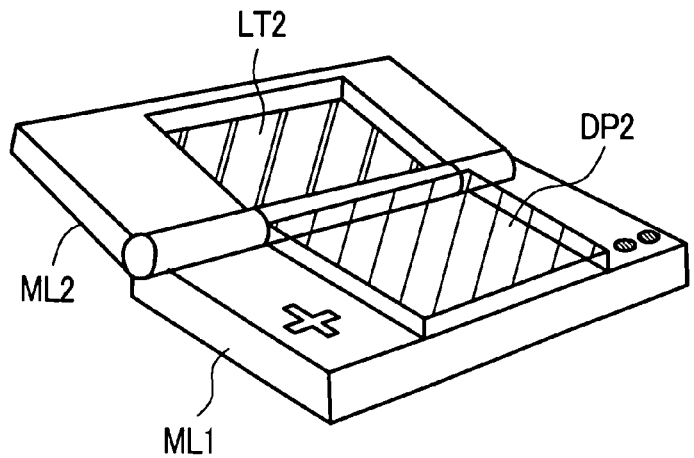

FIG. 1A to FIG. 1C are views for explaining one embodiment of the present invention. The drawings explain a case in which the preset invention is applied to an example of a gaming machine. A first housing ML1 and a second housing ML2 have one-side portions thereof connected with each other at a rotary portion RP. That is, the second housing ML2 is arranged to be rotatable about the rotary portion RP with respect to the first housing ML1, for example.

In a state shown in FIG. 1A, a first display element DP1 is arranged in the first housing ML1, while a second display element DP2 is arranged in the second housing ML2. That is, in the state that the first housing ML1 and the second housing ML2 are opened, a viewer can observe the first display element DP1 and the second display element DP2 with his/her naked eyes. Here, the first housing ML1 and the second housing ML2 are arranged to assume a closed state in a state that one housing is rotated toward the other housing side about the rotary portion RP thus protecting the first display element DP1 and the second display element DP2 from an external obstacle and enhancing the portability.

Figure 2A:
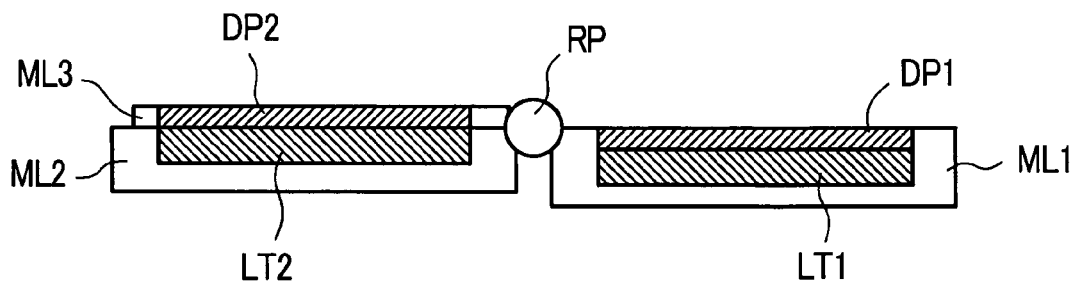
FIG. 2 is a cross-sectional view showing one embodiment of the constitution of the present invention.

Due to such a constitution, the first display element DP1 and the second display element DP2 can display two-dimensional images separately from each other. Although the second display element DP2 is illustrated as the structure which is fitted into the second housing ML2, it is possible to adopt the structure in which the second display element DP2 is stacked on the second housing ML2 as shown in FIG. 2A described later.

Next, FIG. 1B is a view which shows that the second display element DP2 is of a movable type. In the example shown in FIG. 1B, the second display element DP2 is rotated and moved from the second housing ML2 due to the rotary portion RP. Symbol LT2 indicates a second illumination part which is arranged in the second housing ML2 on a back side of the second display element DP2.

FIG. 1C shows a state in which the second display element DP2 is overlapped to the first display element DP1 in plane as a result of the rotation of the second display element DP2 about the rotary portion RP. Accordingly, two display elements are overlapped to each other on the first housing ML1 portion side. In such a state, by adopting a concept described in the related art, it is possible to perform a 3D display.

From the above, usually, both of the first display element DP1 and the second display element DP2 have the equal number of pixels and use display parts (masses of pixels) having substantially equal sizes. However, it is needless to say that the first display element DP1 and the second display element DP2 may differ in the size of the display part. This is because that there exists a demand that the 3D display is performed only in a region where the display part of the first display element DP1 and the display part of the second display element DP2 are overlapped to each other.

In the state shown in FIG. 1A, both of the first display element DP1 and the second display element DP2 can respectively and independently perform the 2D display. Accordingly, compared to the related art, it is possible to enhance the brightness at the time of performing the 2D image display. Further, it is possible to display separate information on two display elements and hence, an information quantity which can be displayed can be increased twofold. Further, a drawback that another display element causes the lowering of a numerical aperture at the time of performing the 2D display can be eliminated in principle and hence, it is possible to enhance the brightness of the 2D display.

Further, by forming one of two display elements in a movable type, a state that two display elements are overlapped to each other as shown in FIG. 1C can be achieved using the same display device. Accordingly, the display device can achieve the excellent 3D display ability.

In this manner, according to the present invention shown in FIG. 1, it is possible to realize the display device which allows the 2D display and the 3D display compatible and, at the same time, allows the 2D and the 3D to obtain optimum displays respectively. Further, by embodying the display device in a form of a gaming machine, it is possible to realize the gaming machine which possesses a 2D display mode and a 3D display mode having a large information quantity. Further, a new interest that the display element is moved is added and hence, it is possible to add a new function to a game realized by the gaming machine thus enhancing an appeal to an interest of a player.

A display device which is used as the first display element DP1 and the second display element DP2 is not particularly limited. For example, organic or inorganic electro luminescence (EL), liquid crystal, electronic paper or the like is used as the display element. However, the movable second display element DP2 is overlapped to the first display element DP1 in the 3D mode and hence, it is necessary to allow at least the second display element DP2 to have a light transmitting property. Accordingly, it is preferable that the second display element DP2 uses the EL which possesses a light transmitting region or the liquid crystal which possesses a light emitting portion. In the first display element DP1, the light transmitting property is not always necessary. Accordingly, besides the EL which possesses the light transmitting region and the liquid crystal which possesses the light transmitting portion, it is possible to adopt the EL or the like operable in a mode in which light is irradiated from an upper surface side of the first housing. Accordingly, with respect to the constitution shown in FIG. 1A to FIG. 1C, when the display element formed of the EL, for example, is used as the first display element DP1, since the EL is self-luminous, the display element can be configured such that an illumination part is not incorporated in the first housing ML1 on a back surface of the first display element DP1.

Figure 2B:
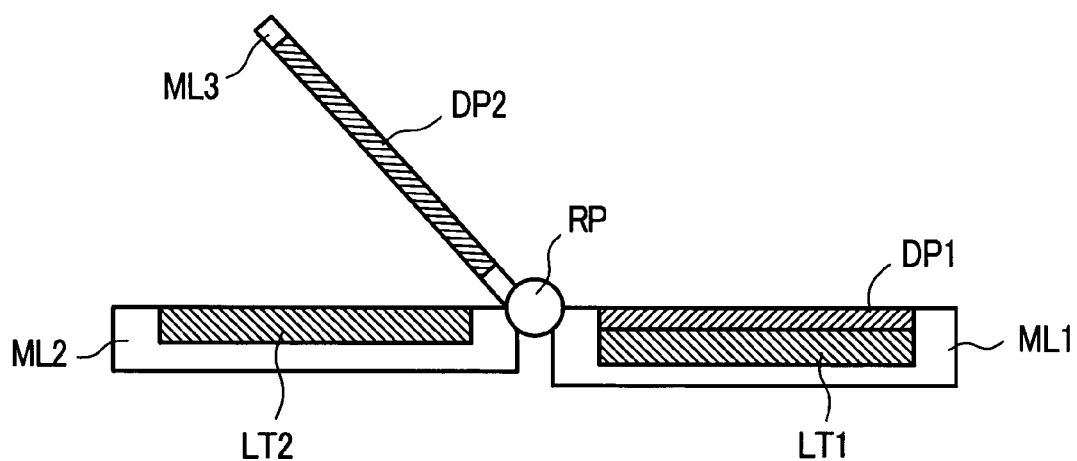
Figure 2C:
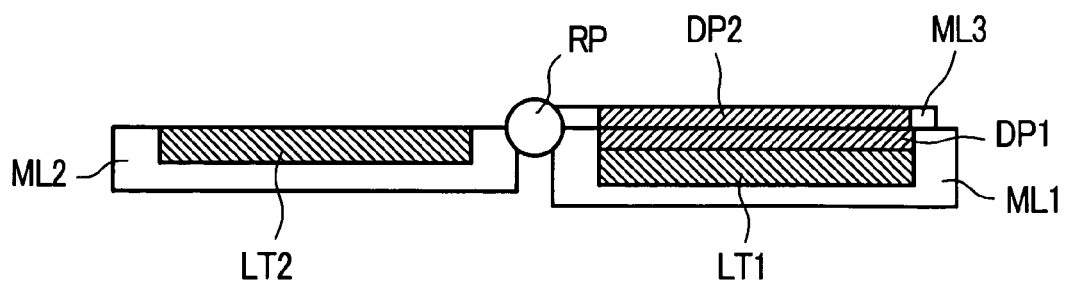

FIG. 2A to FIG. 2C are views for explaining an example of cross-sectional structure corresponding to FIG. 1A to FIG. 1C. In this case, both of the display elements use a liquid crystal display element and hence, an illumination part is necessary on both of the first housing ML1 side and the second housing ML2 side. That is, the display element DP1 is arranged in the first housing ML1 and the illumination part LT1 is arranged below the display element DP1. The display element DP2 is arranged in the second housing ML2 and the illumination part LT2 is arranged below the display element DP2. Further, the display element DP2 is, to be more specific, constituted such that the display element DP2 is mounted on the third housing ML3 which is movable about the rotary portion RP, and the third housing ML3 functions, for example, as a frame in which openings are formed on respective display parts (masses of the pixels) on front and back surfaces of the second display element DP2, for example.

FIG. 2A shows the case in which the 2D display is performed. The first display element DP1 performs the display using the light from the illumination part LT1. The second display element DP2 performs the display using the light from the illumination part LT2.

FIG. 2B shows a state in the midst of the rotational movement of the third housing ML3 about the rotary portion RP.

FIG. 2C shows a state in which the 3D display is performed. In the first housing ML1 portion, the first display element DP1 and the second display element DP2 are sequentially overlapped to the first illumination part LT1. Accordingly, it is possible to realize the 3D display based on the concept of the related art.

Here, the second illumination part LT2 does not contribute to the display and hence, the supply of a power source is stopped. That is, it is desirable that the illumination is turned off. Further, it is desirable that an intensity of the illumination of the first illumination part LT1 in the 3D display state is larger than the intensity of the illumination of the first illumination part LT1 in the 2D display state shown in FIG. 2A. This provision is made based on an understanding that the number of display elements on the illumination part is increased in the 3D display state than the 2D display state thus substantially lowering the numerical aperture or the light transmissivity and hence, it is necessary to compensate for the lowering of the numerical aperture or the light transmissivity by enhancing the brightness of the illumination part. Further, in this case, by turning OFF the second illumination part LT2 it is possible to obtain an advantage that even when electricity supplied to the first illumination part LT1 is increased two-fold, the total power consumption is not increased.

The determination whether the operation mode is the 2D mode or the 3D mode may be performed by detecting a rotational angle of the rotary portion RP, for example. That is, in response to a detection value of the rotational angle corresponding to a position of the third housing ML3, the operation mode is determined as the 2D mode when the rotational angle has a spreading angle of equal to or more than 90° (approximately 180°), while the operation mode is determined as the 3D mode when the rotational angle has the spreading angle of less than 90° (for example, 0°). Alternatively, the determination whether the operation mode is the 2D or the 3D mode may be performed by forming a projecting portion on the first housing ML1, and allowing the projecting portion to be indented when the third housing ML3 and the first housing ML1 are overlapped to each other thus detecting the overlapping. Further, the operation mode may be forcibly changed over in software.

Figure 3A:
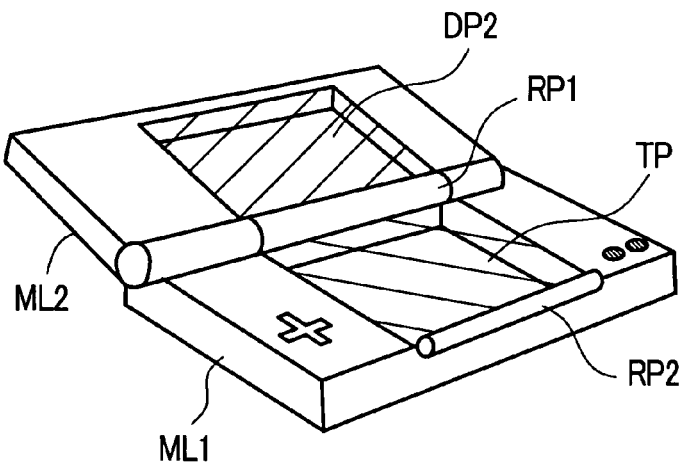
FIG. 3 is a stereoscopic view showing another embodiment of the constitution of the present invention.
Figure 3B:
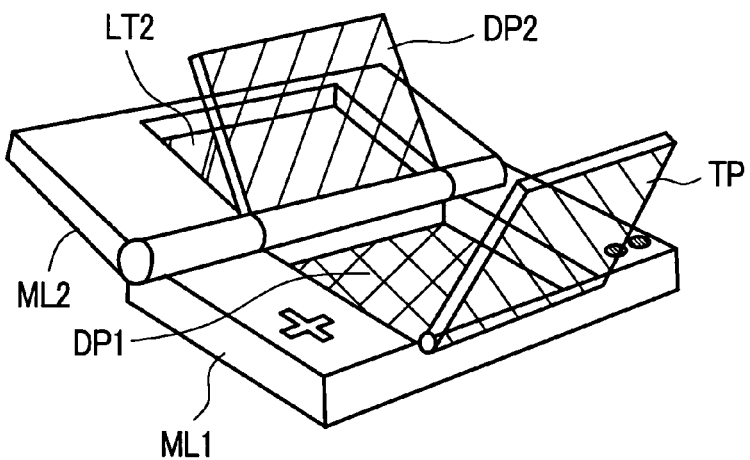
Figure 3C:
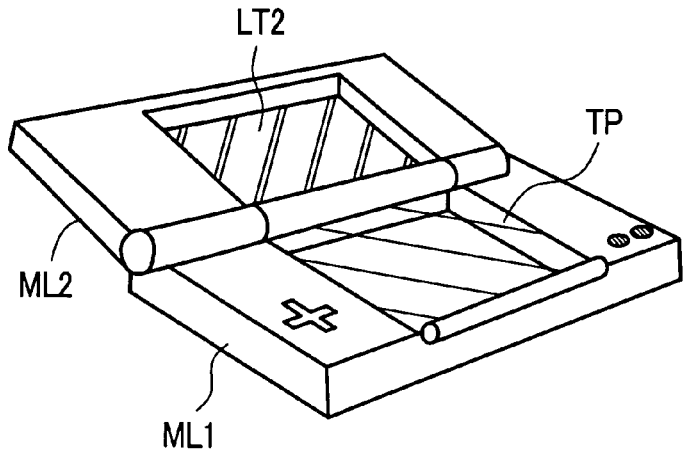

FIG. 3A to FIG. 3C correspond to FIG. 1A to FIG. 1C. The constitution which makes the display device shown FIG. 3A to FIG. 3C different form the display device shown FIG. 1A to FIG. 1C lies in a point that a touch panel TP is provided.

Particularly, in the gaming machine, the presence of the touch panel is essential for enhancing the gaming property. However, when the touch panel is interposed between two display elements at the time of performing the 3D display, such a constitution may cause blurring of a 3D display image. Accordingly, inventors of the present invention have found out that it is desirable to provide a display device which allows the touch panel to be used in both of the 2D display state and the 3D display state and prevents the touch panel from being interposed between the display elements.

FIG. 3A is a drawing which shows that the touch panel TP is arranged on the first display element DP1. In this state, both of the first display element DP1 and the second display element DP2 can respectively display 2D images and can manipulate the touch panel TP.

FIG. 3B is a view showing a moving state of the second display element DP2 and the touch panel TP. The second display element DP2 is moved due to a first rotary portion RP1. Here, the touch panel TP is also rotated about a second rotary portion RP2. The second rotary portion RP2 is formed on the first housing ML1, and is arranged on a side opposite to the first rotary portion RP1 with the first display element DP1 therebetween and substantially parallel to the first rotary portion RP1. In this case, the respective moving directions of the second display element DP2 and the touch panel TP2 become the same direction. Due to the movement of the touch panel TP, the first display element DP1 is exposed in the first housing ML1, and the second display element DP2 is stored on (overlapped to) to the first display element DP1.

FIG. 3C shows a state in which the second display element DP2 is stored on (overlapped to) the first display element DP1, and the touch panel TP is made to return such that the touch panel TP is arranged above the second display element DP2. Due to such a constitution, it is possible to achieve a state in which the first display element DP1, the second display element DP2 and the touch panel TP are sequentially stacked in the first housing ML1 portion and hence, it is possible to use the touch panel even in the 3D display state and, at the same time, it is possible to provide the constitution which prevents the touch panel from being interposed between two display elements.

FIG. 4A to FIG. 4D are cross-sectional views for explaining an example of the constitution explained in conjunction with FIG. 3.

Figure 4A:
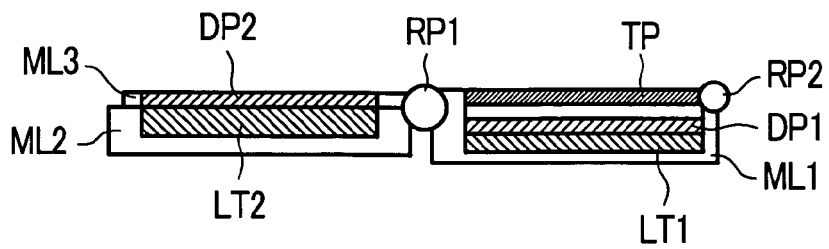
FIG. 4 is a cross-sectional view showing another embodiment of the constitution of the present invention.

In FIG. 4A, the illumination part LT1 is mounted on the first housing ML1, and the first display element DP1 is mounted on the illumination part LT1. The touch panel TP is arranged above the first display element DP1 by way of a space. A second illumination part LT2 is mounted on the second housing ML2. The second display element DP2 is mounted on the third housing ML3 of a movable type.

Figure 4B:
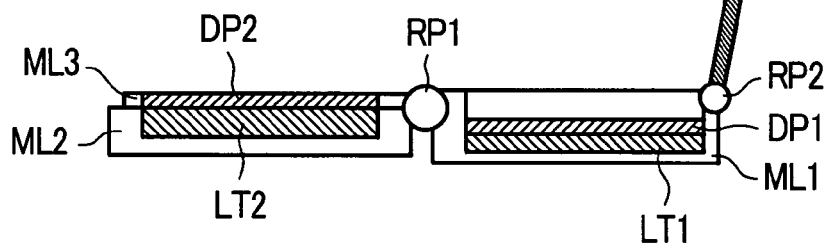

FIG. 4B shows a state in which the touch panel TP is moved about the second rotary portion RP2. In such a state, a space is defined above the first display element DP1. This space constitutes an accommodating space of the second display element DP2 as will be understood by the explanation made later, wherein the space is appreciated as a recessed portion of the first housing ML1 which uses the first display element DP1 as a bottom surface.

Figure 4C:
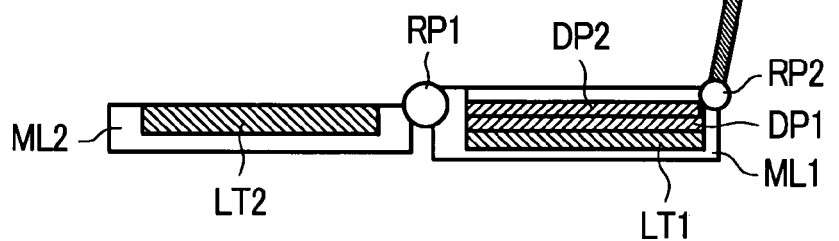

FIG. 4C shows a state in which the second display element DP2 is stored in the first housing ML1.

Figure 4D:
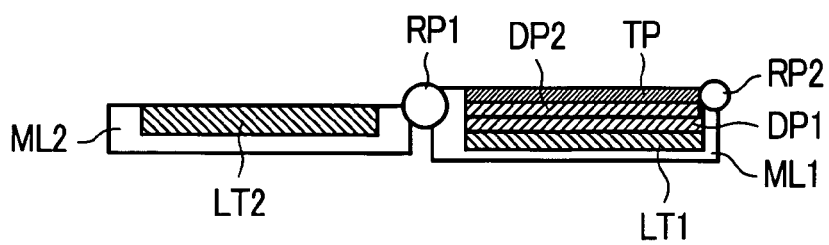

FIG. 4D shows a state in which the touch panel TP is made to return onto the second display element DP2.

The space (gap) is defined between the first display element DP1 and the touch panel TP in the stage shown in FIG. 4A, and the second display element DP2 is accommodated in the space and hence, the touch panel TP can be used at the time of performing the 2D display as well as at the time of performing the 3D display in which two display elements are overlapped to each other. Further, due to such a constitution, it is possible to easily perform the movement of the touch panel TP without making the constitution of the rotary portion RP2 complicated.

Other examples are also applicable as the moving method of the touch panel. FIG. 5A and FIG. 5B show some of these examples. FIG. 5A shows the example of the constitution in which the touch panel TP is lifted from the first housing ML1 using an arm, the third housing ML3 which includes the display part DP2 is arranged in a space where the touch panel TP was present, and the touch panel TP is made to return onto the third housing ML3. In this case, a height of the touch panel TP from the first housing ML1 differs between at the time of using the 2D display and at the time of using the 3D display. In this case, it is possible to obtain an advantage that the touch panel TP can be directly mounted on the display element in both of the 2D and the 3D. When a space is present between the touch panel and the display element, the displacement is liable to be generated between the targeted touch image and an actual touch area due to the relationship of a parallactic angle by an amount corresponding to the space. However, it is possible to minimize such a parallactic angle by directly mounting the touch panel on the display element in both of 2D display and 3D display. Accordingly, it is possible to reduce erroneous touching of a manipulator thus providing the touch panel which can be easily handled.

FIG. 5B is a view showing a concept in which the touch panel TP is moved by the rotation in the horizontal direction. In this case, a fulcrum of rotation is limited to one point and hence, the touch panel TP hardly generates the positional displacement thereof even when the display device is used for a long time.

Figure 6A:
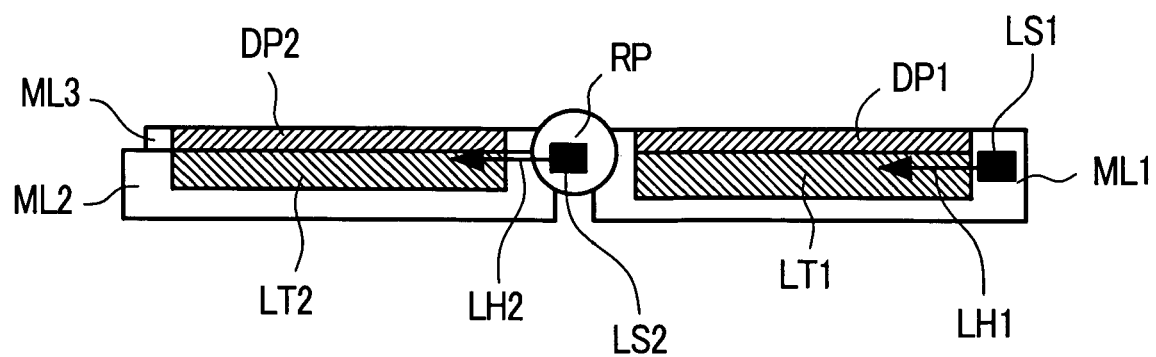
FIG. 6 is a cross-sectional view showing another embodiment of the constitution of the present invention.
Figure 6B:
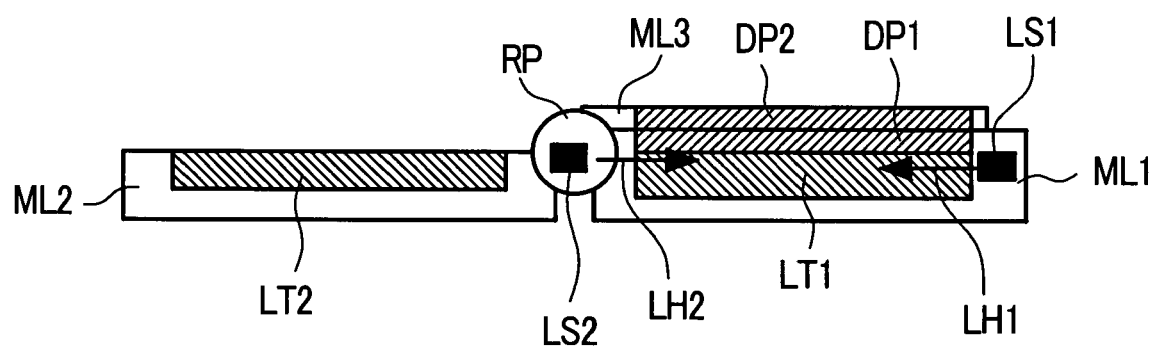

FIG. 6A and FIG. 6B show an example for enhancing the brightness at the time of performing the 3D display.

FIG. 6A shows the display device at the time of performing the 2D display, wherein light from the first light source LS1 is introduced into the first illumination part LT1 in the first housing ML1. The light is introduced into the first display element DP1. The second illumination part LT2 is arranged in the second housing ML2. The second light source LS2 is arranged in the rotary portion RP and the light from the second light source LS2 is incident on the second illumination part LT2. Light from the second illumination part LT2 is introduced into the second display element DP2 arranged in the third housing ML3. Due to such a constitution, the first display element DP1 and the second display element DP2 can respectively realize individual 2D images.

FIG. 6B shows the display device at the time of performing the 3D display, wherein the second display element DP2 is mounted on the first display element DP1. Here, by providing the second light source LS2 to the rotary portion RP, the second light source LS2 is also rotated simultaneously with the rotational movement of the second display element DP2. Then, in the state shown in FIG. 6B, light from the second light source LS2 is incident on the first illumination part LT1. Accordingly, compared to the case in which the 2D display is performed, the number of light sources corresponding to the first illumination part LT1 is increased twofold in the 3D display. Accordingly, at the time of performing the 3D display, the irradiation of light from the second illumination part LT2 is automatically turned off and, at the same time, a quantity of light incident on the first display element DP1 from the first illumination part LT1 is increased compared to the case in which the 2D display is performed. Accordingly, this example can effectively make use of portions of the light source member and, at the same time, it is possible to achieve the enhancement of brightness at the time of performing the 3D display without requiring a particular control and the stop of irradiation of the undesired illumination part.

Further, although drawings are described with respect to the example in which an LED light source is used, for example, a cold cathode fluorescent lump (CFL) may be arranged at the center of a rotary portion (RP), and a reflector which surrounds a periphery of the cold cathode fluorescent lump (CFL) in a semicircular shape may be rotated. By directing an opening formed in the reflector toward the second housing ML2 in the stage shown in FIG. 6A and by directing the opening formed in the reflector toward the first housing ML1 in the stage shown in FIG. 6B, it is possible to obtain the substantially same advantageous effects even when the linear light source is used.

Figure 7A:
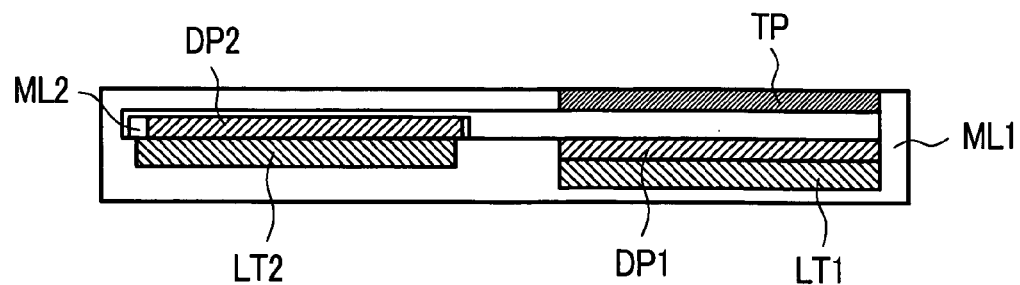
FIG. 7 is a cross-sectional view showing another embodiment of the constitution of the present invention.
Figure 7B:
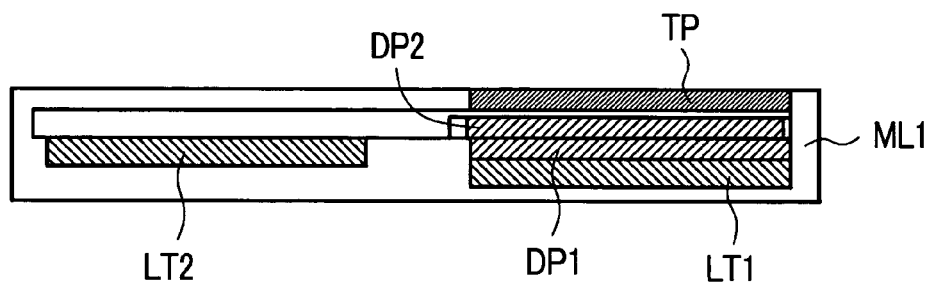

Although the explanation has been made in conjunction with FIG. 1 to FIG. 6 with respect to the example in which the second display part is rotated about the rotary portion, the display device may be constituted to achieve the same object by allowing the second display part to perform the horizontal movement. FIG. 7A and FIG. 7B show an example which adopts such horizontal movement of the second display part.

FIG. 7A is a cross-sectional view showing a 2D display state. A first illumination part LT1 and a first display element DP1 are mounted in the first housing ML1. A space is defined above the first display element DP1. Above the space, a touch panel TP is arranged when necessary. A second illumination part LT2 is arranged at a position (left side in the drawing) displaced from the first display element DP1 in the first housing ML1. Further, the space defined above the first display element DP1 extends to a position above the second illumination part LT2 thus forming a large space. In the space, a movable second housing ML2 is arranged, and a second display element DP2 is arranged in the housing. In the state shown in FIG. 7A, the second display element DP2 is positioned to be overlapped to the second illumination part LT2. Accordingly, the first display element DP1 and the second display element DP2 can individually display 2D images.

FIG. 7B is a view showing a state in which the second housing ML2 is moved so as to arrange the second display element DP2 above the first display element DP1. Due to such a constitution, the first display element DP1 and the second display element DP2 are stacked to each other and hence, a 3D display can be realized.

Figure 8A:
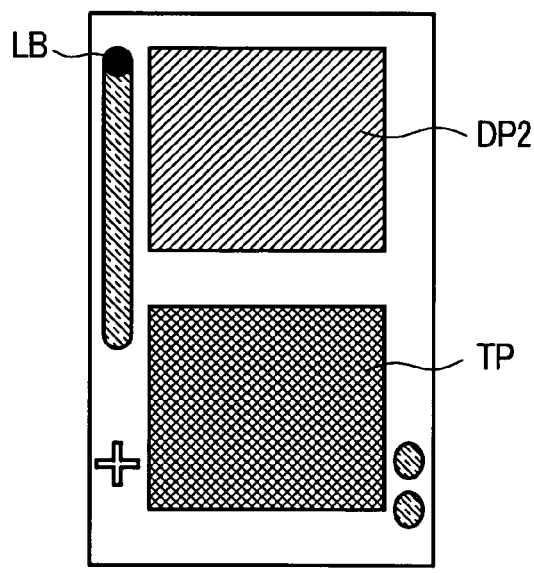
FIG. 8 is a plan view showing another embodiment of the constitution of the present invention.
Figure 8B:
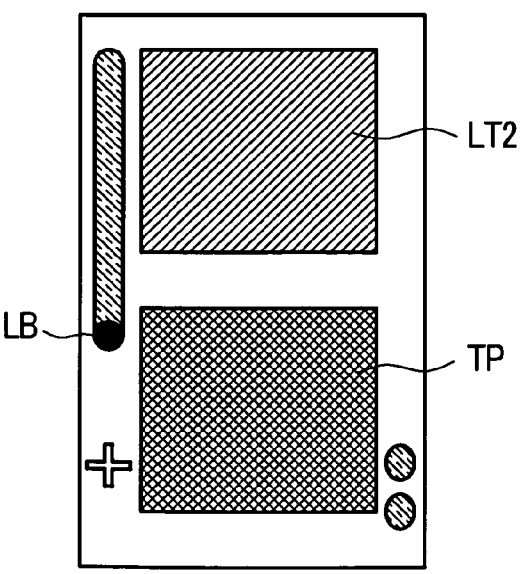

FIG. 8A and FIG. 8B are explanatory views when FIG. 7A and FIG. 7B are viewed from an upper surface of a display device or a gaming machine. In a state shown in FIG. 8A which corresponds to FIG. 7A, the touch panel TP is arranged above the first display element DP1. The second display element DP2 is arranged in a displaced manner from the first display element DP1 in plane. Symbol LB indicates a movement lever. The movement lever LB is constituted such that the movement lever LB is connected with the second display element DP2 directly or by way of a mechanism (for example, links) not shown in the drawing.

FIG. 8B corresponds to FIG. 7B. With the manipulation of the movement lever LB, the second display element DP2 is lowered to a lower side in a drawing and is arranged to be overlapped to the first display element DP1. Accordingly, the 3D display is realized.

The method described in FIG. 7 and FIG. 8 is characterized in that by arranging a transparent plastic plate or glass plate on the second illumination part LT2 and by providing a movable sealing member made of resin or rubber on a periphery of the movement lever LB, a whole region in which the second display element DP2 is moved can be hermetically sealed. Accordingly, it is possible to eliminate the influence attributed to dusts from the outside or the like and hence, the display device is suitable for an outside use or use in a severe environment.

Here, to complement the explanations made in conjunction with FIG. 1 to FIG. 8, in the 3D display state, that is, in the state that two display elements are overlapped to each other, it is desirable to define a distance between these two display elements. This provision can enhance the 3D feeling. This provision can be easily achieved by properly setting the position of the second display element DP2 with respect to the first display element DP1 in the thickness direction of the housing ML3 which constitutes the operable portion in FIG. 1 to FIG. 6 or the housing ML3 which constitutes the operable portion in FIG. 7 and FIG. 8.

Further, such a provision can be easily achieved by arranging the first display element DP1 such that the first display element DP1 is allowed to fall downwardly from images shown in the respective views in the first housing ML1.

Figure 9A:
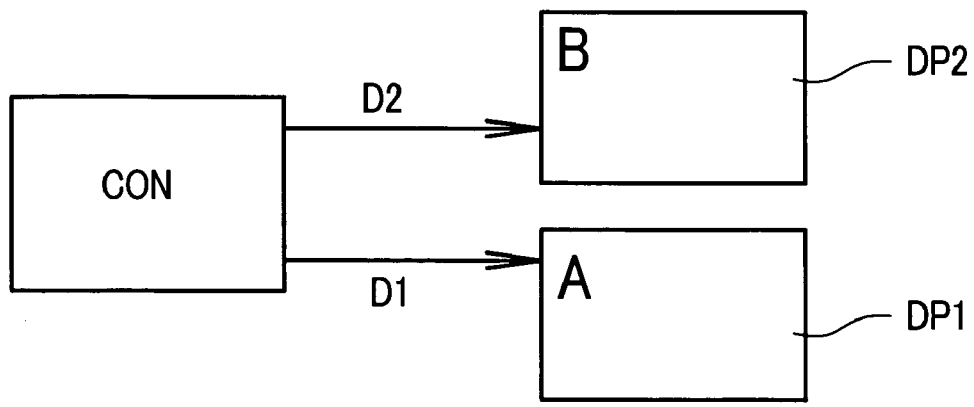
FIG. 9 is an explanatory view showing one example of a system of the present invention.

Next, the explanation is made with respect to images which are displayed on the first display element DP1 and the second display element DP2. FIG. 9A shows an example in which a first control signal D1 is supplied to the first display element DP1 from a control circuit CON, and a second control signal is supplied to the second display element DP2 from the control circuit CON. In performing the 2D display, a given image or character information may be usually displayed on the first display element DP1 and the second display element DP2.

In the horizontal moving method shown in FIG. 7 and FIG. 8, when the 3D display is performed by overlapping the first display element DP1 and the second display element DP2, the images may be adjusted by the control circuit CON such that the images become appropriate to realize a 3D image and, these images may be displayed on the first display element DP1 and the second display element DP2.

On the other hand, in the constitution shown in FIG. 1 to FIG. 6 in which the second display element DP2 is rotatably moved, a particular consideration is necessary at the time of performing the 3D display. That is, an upper side of the second display element DP2 in the 2D display state is positioned at a lower side of the first display element DP1 in the 3D display state.

Figure 9B:
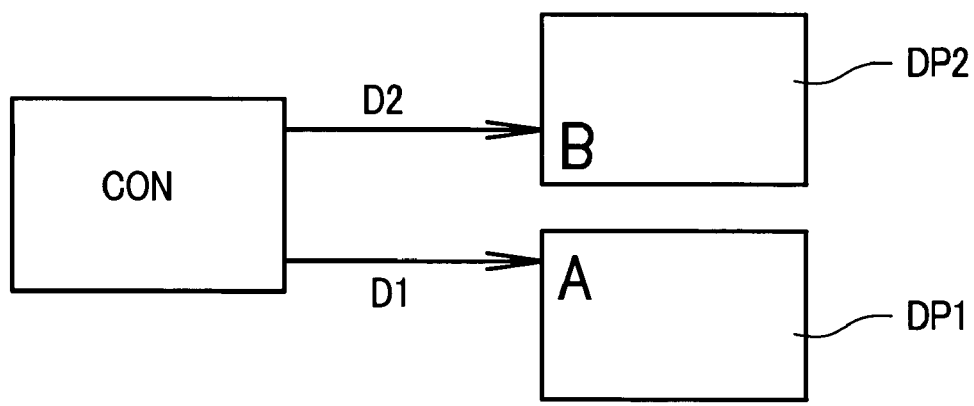
Figure 9C:
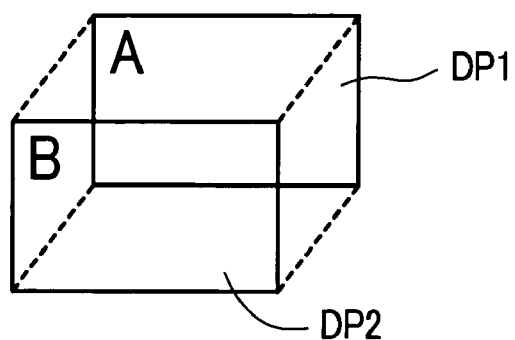

Accordingly, when the display is performed as it is without adjustment, the display position becomes up-side-down. Further, in the second display element DP2, the 2D state and the 3D state have back and front surfaces of the display become reversed from each other and hence, the direction of characters is inverted. Accordingly, at the time of performing the changeover from the 2D display to the 3D display, it is necessary to invert the image on the second display element DP2 such that, compared to the 2D state shown in FIG. 9A, a side of a start position of a character is inverted up-side-down as shown in FIG. 9B and the image per se is also inverted up-side-down. By performing such an adjustment, even in a state that the first display element DP1 and the second display element DP2 are overlapped to each other as shown in FIG. 9C, it is possible to perform the normal display of the character. Further, at the time of performing the 3D display, after performing the change of the direction of the display image, the control circuit CON adjusts the image per se to an image suitable for the 3D display and hence, it is possible to further enhance the 3D feeling.

Various ideas which are disclosed in the present invention to cope with the drawbacks of the related art may be used in suitable combinations so as to enhance the advantageous effects of the present invention. Although examples of all combinations are not described individually, those who are skilled in the art can sufficiently understand the manner for exercising these combinations and hence, the enumeration of the individual combination example is omitted.

What is claimed is:

1. A display device comprising:
a first display element and a second display element;
wherein the first display element is fixed and the second display element is movable,
the first display element and the second display element assume a first state in which the first display element and the second display element are individually arranged and a second state in which the first display element and the second display element are arranged in an overlapped manner, and
a two-dimensional image is displayed in the first state and a three-dimensional image is displayed in the second state.

2. A display device according to claim 1, wherein the first state and the second state are changed over by allowing the second display element to move rotatably.

3. A display device according to claim 2, wherein an illumination part is formed on a back surface of the first display element and a light quantity of the illumination part is increased in the second state than in the first state.

4. A display device according to claim 2, wherein a first illumination part is formed on a back surface of the first display element, a second illumination part is formed on a back surface of the second display element, the first illumination part and the second illumination part are turned on in the first state, and the first illumination part is turned on and the second illumination part is turned off in the second state.

5. A display device according to claim 1, wherein the first state and the second state are changed over by allowing the second display element to move horizontally.

6. A display device according to claim 5, wherein an illumination part is formed on a back surface of the first display element and a light quantity of the illumination part is increased in the second state than in the first state.

7. A display device according to claim 3, wherein a first illumination part is formed on a back surface of the first display element, a second illumination part is formed on a back surface of the second display element, the first illumination part and the second illumination part are turned on in the first state, and the first illumination part is turned on and the second illumination part is turned off in the second state.

8. A display device according to claim 1, wherein an illumination part is formed on a back surface of the first display element and a light quantity of the illumination part is increased in the second state than in the first state.

9. A display device according to claim 1, wherein a first illumination part is formed on a back surface of the first display element, a second illumination part is formed on a back surface of the second display element, the first illumination part and the second illumination part are turned on in the first state, and the first illumination part is turned on and the second illumination part is turned off in the second state.

10. A display device comprising:
a first housing, a second housing and a third housing, wherein
the third housing assumes a first state in which the third housing is overlapped to the second housing and a second state in which the third housing is overlapped to the first housing, and a first display element is arranged in the first housing and a second display element is arranged in the third housing, and
the first display element and the second display element display a two-dimensional image in the first state and the first display element and the second display element display a three-dimensional image in the second state.

11. A display device according to claim 10, wherein the third housing is shifted to the first state and the second state due to the rotation of the third housing.

12. A display device according to claim 11, wherein the first display element and the second display element display a two-dimensional image in the first state and the first display element and the second display element display a three-dimensional image in the second state.

13. A display device according to claim 12, wherein the display device includes a movable touch panel, and the touch panel is arranged above the first display element in the first state and is arranged above the second display element in the second state.

14. A display device according to claims 13, wherein the second display element has a display position thereof inverted in the up-side-down direction of the second display de%4ee element in displaying a same figure when the rotational axis extending direction of the third housing assumes the horizontal direction in the first state and the second state, and the figure to be displayed per se is inverted up-side-down.

15. A display device according to claim 11, wherein the first housing includes a first illumination part which is arranged below the first display element and a first light source which becomes a light source of the first illumination part, the second housing includes a second illumination part, a rotation part which performs the rotation of the third housing includes a light source, the rotation part includes a second light source, wherein the second light source becomes a light source of the second illumination part in the first state and the second light source becomes a light source of the first illumination part in the second state.

16. A display device according to claim 15, wherein the display device includes a movable touch panel, and the touch panel is arranged above the first display element in the first state and is arranged above the second display element in the second state.

17. A display device according to claims 16, wherein the second display element has a display position thereof inverted in the up-side-down direction of the second display element in displaying a same figure when the rotational axis extending direction of the third housing assumes the horizontal direction in the first state and the second state, and the figure to be displayed per se is inverted up-side-down.

18. A display device according to claims 15, wherein the second display element has a display position thereof inverted in the up-side-down direction of the second display element in displaying a same figure when the rotational axis extending direction of the third housing assumes the horizontal direction in the first state and the second state, and the figure to be displayed per se is inverted up-side-down.

19. A display device according to claims 11, wherein the second display element has a display position thereof inverted in the up-side-down direction of the second display element in displaying a same figure when the rotational axis extending direction of the third housing assumes the horizontal direction in the first state and the second state, and the figure to be displayed per se is inverted up-side-down.

20. A display device according to claim 10, wherein the display device includes a movable touch panel, and the touch panel is arranged above the first display element in the first state and is arranged above the second display element in the second state.

21. A display device according to claims 20, wherein the second display element has a display position thereof inverted in the up-side-down direction of the second display element in displaying a same figure when the rotational axis extending direction of the third housing assumes the horizontal direction in the first state and the second state, and the figure to be displayed per se is inverted up-side-down.

22. A display device according to claims 10, wherein the second display element has a display position thereof inverted in the up-side-down direction of the second display element in displaying a same figure when the rotational axis extending direction of the third housing assumes the horizontal direction in the first state and the second state, and the figure to be displayed per se is inverted up-side-down.

23. A game machine with display device comprising: a first display element and a second display element,
wherein the first display element is fixed and the second display element is movable, the first display element and the second display element assume a first state in which the first display element and the second display element are individually arranged and a second state in which the first display element and the second display element are arranged in an overlapped manner, and
the first display element and the second display element display a two-dimensional image in the first state and the first display element and the second display element display a three-dimensional image in the second state.

* * * * *